United States Patent [19]

Tomori

[11] 4,359,276
[45] Nov. 16, 1982

[54] INTERCHANGEABLE LENS BARREL

[75] Inventor: Yasumasa Tomori, Sakado, Japan

[73] Assignee: Asahi Kogaku Kogyo Kabushiki Kaisha, Tokyo, Japan

[21] Appl. No.: 298,171

[22] Filed: Aug. 31, 1981

[30] Foreign Application Priority Data

Sep. 10, 1980 [JP] Japan .......................... 55-128758[U]

[51] Int. Cl.³ .............................................. G03B 3/00
[52] U.S. Cl. .................... 354/195; 350/255; 354/25
[58] Field of Search ................... 354/195, 25 R, 25 N; 350/255

[56] References Cited

U.S. PATENT DOCUMENTS

| 3,165,044 | 1/1965 | Himmelsback | 350/255 |
| 3,594,068 | 7/1971 | Kirstein et al. | 350/255 |
| 4,067,031 | 1/1978 | Enomoto | 354/195 |
| 4,210,387 | 7/1980 | Ogawa | 350/255 X |

Primary Examiner—John Gonzales

Attorney, Agent, or Firm—Merchant, Gould, Smith, Edell, Welter & Schmidt

[57] ABSTRACT

An interchangeable lens barrel for an automatic focussing camera comprising focussing lens means which are screwed in a non-rotatable member of the lens barrel and which rotate about and move in directions of the optical axis, a driving mechanism for rotating the focussing lens means in response to a drive signal from a focus detecting device of a camera body to which the lens barrel is to be mounted, said focussing lens means being capable of moving between front and rear extremities which are defined by the engagement of an abutment provided on the focussing lens means with a pair of stops which are provided on the non-rotatable member of the lens barrel and which come into contact with the abutment to limit the movement of the focussing lens means, wherein the improvement comprises brake means provided in the vicinity of the stops and engaged by the abutment to increase the resistance against the movement of the focussing lens means at the extremities.

10 Claims, 9 Drawing Figures

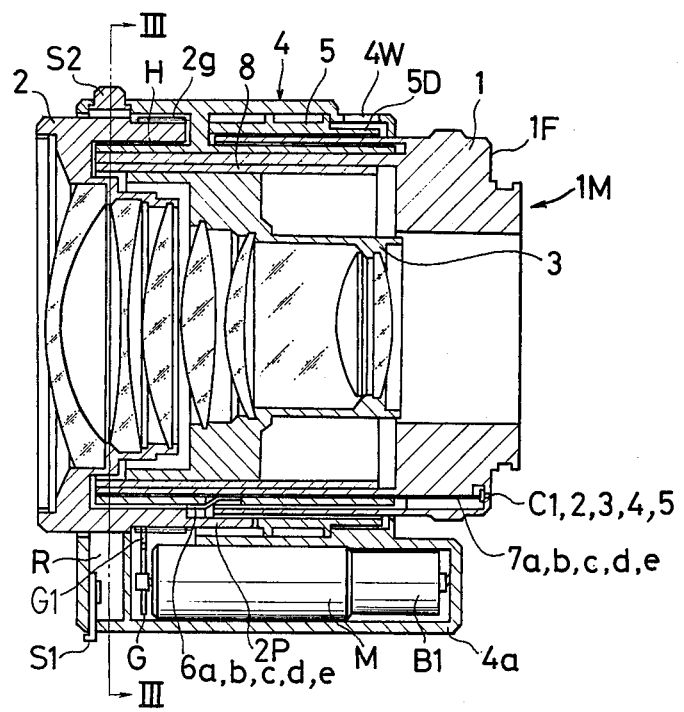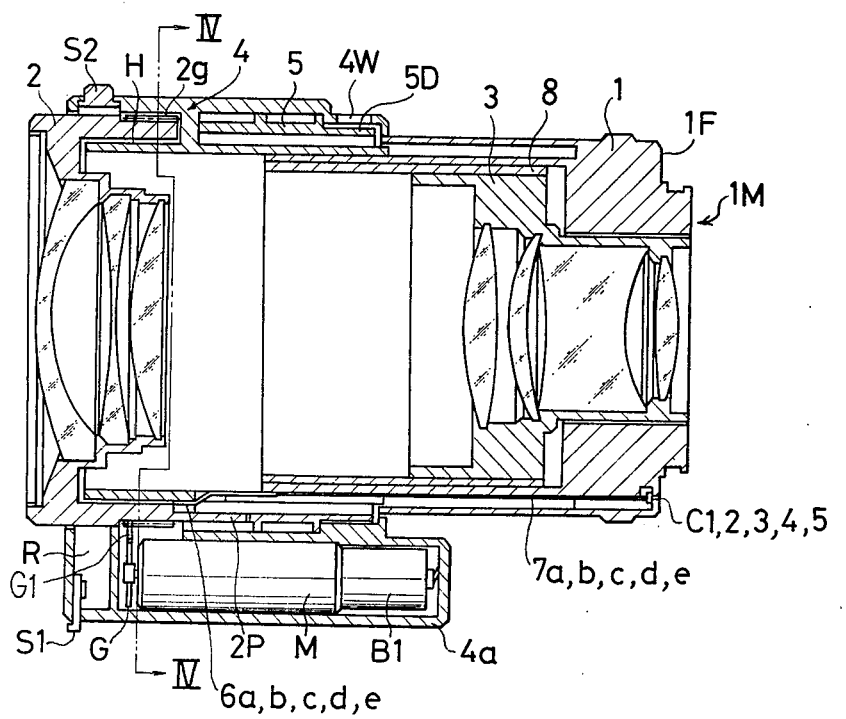

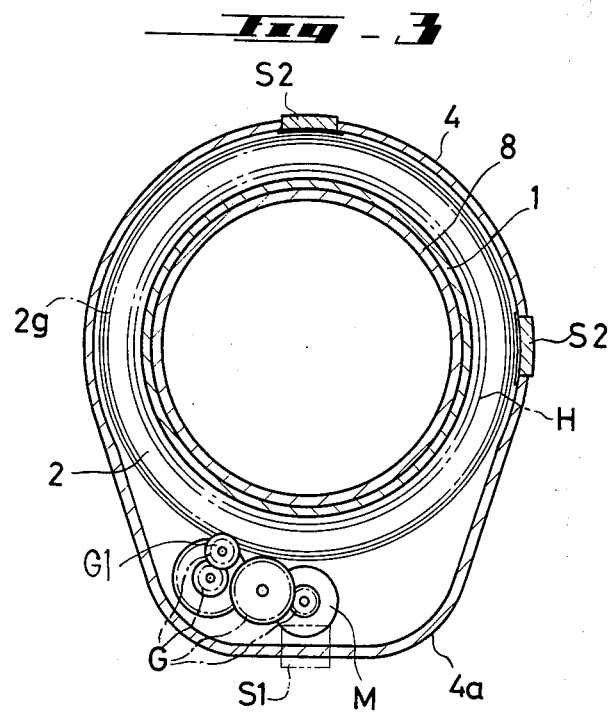
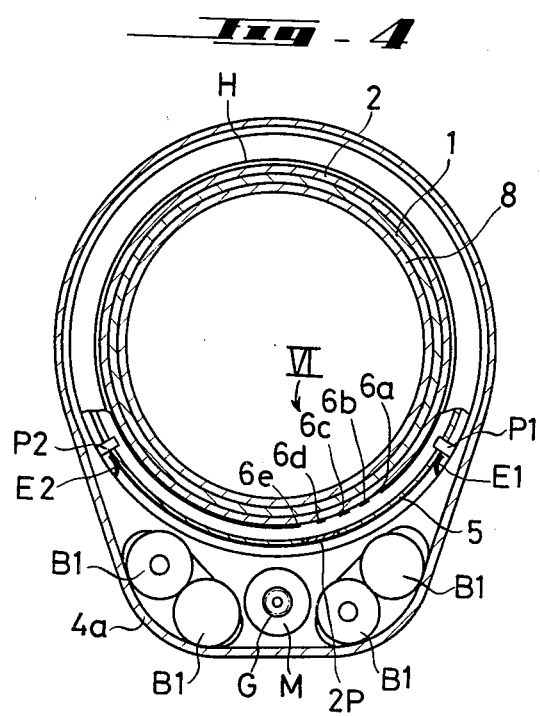

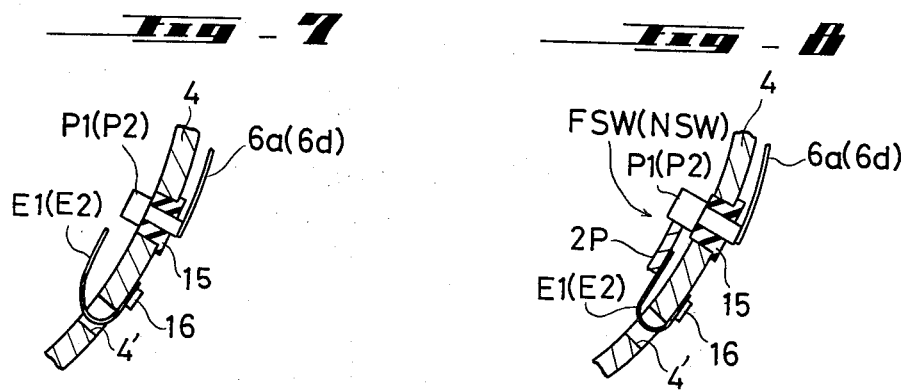
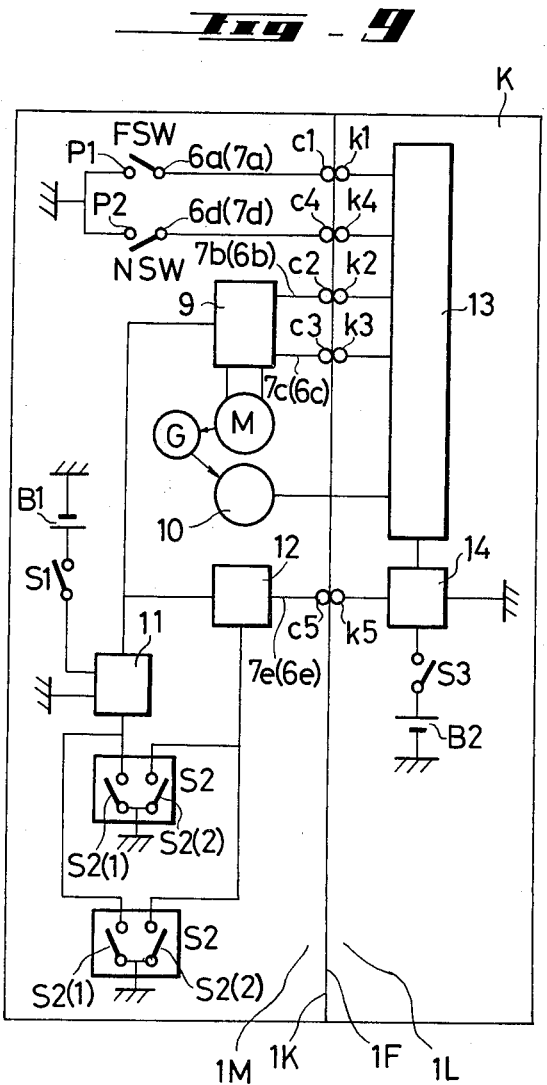

INTERCHANGEABLE LENS BARREL

This invention relates to an interchangeable lens barrel for an automatic focussing camera.

There is known an automatic focussing camera in which focussing lens means is driven by a driving motor provided in an interchangeable lens barrel, and a focus detecting device is provided in a camera body, for detecting the focal point of the focussing lens means to move the latter in order to focus an image on the focal plane, i.e, on the film plane. The drive signal from the focus detecting device is fed to the driving motor for the focussing lens means, so that automatic focussing can be effected. In this type of known lens barrel for an automatic focussing camera, it is necessary for the focussing lens means to rotate with a drive force much less than a drive force necessary for a manual focussing operation in order to decrease the power consumption of the driving motor and to achieve a quick focussing. However it has been found that when the focussing lens means come to their front and rear extremities (end positions), they tend to be subject to a shock or tend to rebound, due to a small resistance against the movement of the focussing lens means. The focussing lens means which are screw-engaged on a non-rotatable portion of the lens barrel has an abutment integral and rotatable with the lens barrel. By the engagement of the abutment with a pair of stops provided on the non-rotatable portion for limiting the rotational movement of the focussing lens means, the latter is stopped at their front and rear extremities. When the abutment comes into contact with the stops, the focussing lens means are subject to a shock or rebound, so that the focussing lens means can be displaced from their extremities or can oscillate.

The applicant has proposed the provision of detection switches on a lens barrel, for detecting the focussing lens means located at their extremeties and the detection signal from the detection switches are fed back to the focus detecting device of the camera body. However, in such a proposed lens barrel, it has been found that when the focussing lens means rebound or oscillate, the detection signal cannot be exactly and reliably fed to the camera body.

The primary object of the present invention is therefore to provide an interchangeable lens barrel in which focussing lens means can be driven by a driving motor so that the focussing lens means axially move between its front and rear end positions and the focussing lens means are not subject to a shock when they come to their end positions, which results in the prevention of the focussing lens means from rebounding or oscillating.

The secondary object of the present invention is to provide an interchangeable lens barrel including detection switches which detect the focussing lens means located at their end positions and reliably issue an exact detection signal.

Another object of the present invention is to provide an interchangeable lens barrel including detection switches which are adapted not only to detect the focussing lens means located at their end positions but also to prevent the focussing lens means from being subject to a shock, rebounding or oscillating.

In order to achieve the objects of the present invention, according to the present invention, brake members are provided in the vicinity of stops for limiting the movement of the focussing lens means, to engage with an abutment of the focussing lens means, so that the resistance against the rotational movement of the focussing lens means can be increased immediately before the abutment of the focussing lens means is engaged by the stops. The stops and the brake members may be terminals of the detection switches which are closed by the abutment, so that the brake members are formed by the detection switches.

The invention will be discussed below in detail, with reference to the accompanying drawings in which;

FIGS. 1 and 2 are longitudinal sectional views of an interchangeable lens barrel according to an embodiment of the present invention, shown in different positions;

FIG. 3 is a sectional view taken along the line III—III in FIG. 2;

FIG. 4 is a sectional view taken along the line IV—IV in FIG. 2;

FIGS. 7 and 8 are enlarged sectional views of a projection abutment, stop pins, and leaf springs which form brake members, in different positions; and FIG. 9 is a diagram showing a control circuit provided between the camera body and the lens barrel, according to the present invention.

FIGS. 1 and 2 show a zoom lens system including two groups of lenses, according to the present invention. The lenses are located at the longest focal length position and the shortest focal length position in FIGS. 1 and 2, respectively.

Figure 5:
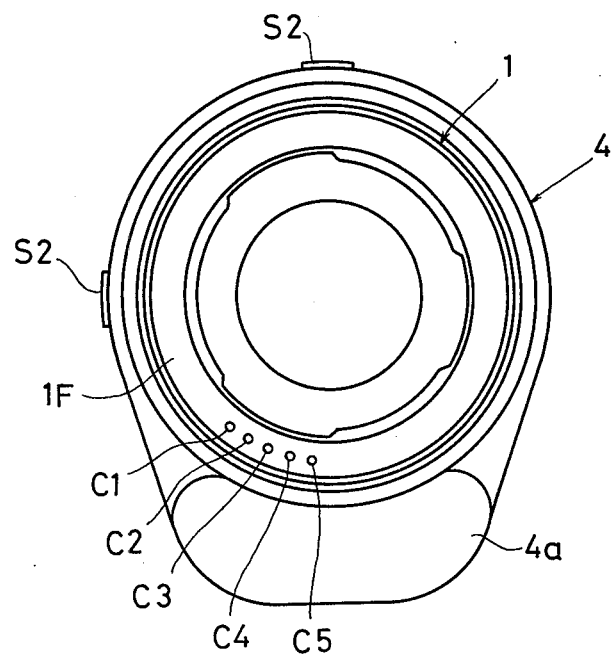
FIG. 5 is a right side elevational view of FIG. 1.

A mount securing barrel 1 has a mount 1M which can be connected to a mount 1L of a camera body K (FIG. 9). A zooming barrel 4 is movably supported on the stationary barrel, i.e., the mount securing lens barrel 1 so that the zooming barrel can slide on the stationary barrel only in directions of the focal axis. In other words, the zooming barrel is a non-rotating member. In the zooming barrel 4 is screwed a front lens barrel 2 carrying a group of front lenses which are focussing lenses, by means of a helicoid H. The zooming barrel 4 has a lower ridged portion 4a integral therewith, in which a driving motor M and a gear mechanism (gear train) G which is rotated by the driving motor M are arranged. The gear train G has a terminal output gear G1 which is engaged by a peripheral gear 2g on the front lens barrel 2. The width of the gear 2g is such that the gear 2g always engages with the terminal output gear G1 even when the front lens barrel moves in the focal axis direction to focus the focussing lens means.

The ridged portion 4a is provided, on its front end, with a circuit chamber R in which circuits, such as a bridge circuit 9, a regulator circuit 11, and a barrel switch circuit 12 (FIG. 9) are arranged. In the rear end of the ridged portion 4a is arranged a battery B1 for a driving motor M. S1 designates a switch of the battery B1.

A rear lens barrel 3 which carries a group of rear lenses is slidably fitted in a driving barrel 8 which is rotated at its fixed axial position in accordance with the axial displacement of the zooming barrel 4 without moving in the optical axial direction. The rotation of the driving barrel 8 causes the rear lens barrel 3 to move in the axial direction while preventing the rear lens barrel from rotating by the stationary lens barrel 1. The displacement of the rear lens barrel 3 has a predetermined relationship to the axial displacement of the front lens barrel 2, so that the focal length of the front and rear lenses varies.

In the zooming barrel 4 is rotatably supported a distance ring 5 which has an axial groove extending parallel to the focal axis. The front lens barrel 2 has a projection 2P which is fitted in the axial groove so that the front lens barrel rotates together with the distance ring 5. On the outer periphery of the distance ring 5 is provided an indicating portion of a scale of the object distance, which scale is visible through a window opening 4W formed in the zooming barrel 4.

On the outer periphery of the zooming barrel 4 are provided two spaced actuation buttons S2 which are biased outwards by proper spring means (not shown). The inward movement of the buttons S2 causes switches S2(1) and S2(2) which are connected to each other in a parallel fashion in a circuit shown in FIG. 9 to be closed at one time.

The switch S2(1) is a starting switch for the driving motor M and the switch S2(2) is an actuation switch for a focus detecting circuit 13.

When the front lens barrel 2 rotates, the projection 2P thereof can be engaged by stop pins P1 and P2 which limit the rotational movement of the lens barrel 2 and which are spaced from one another on the inner periphery of the zooming barrel 4, as shown in FIGS. 4, 7 and 8. That is, the pins P1 and P2 define two end positions, i.e. front and rear end positions of the axial movement of the front lens barrel 2. Between the pins P1 and P2, leaf springs E1 and E2 are provided in the vicinity of the pins, respectively. The leaf springs E1 and E2 are generally U-shaped and are secured, at their one end, to the outer periphery of the zooming barrel 4 by means of pins 16. The free ends of the leaf springs extend through opening 4' of the barrel 4 and along the inner periphery of the barrel 4. As shown in FIG. 8, the free ends of the leaf springs E1 and E2 are pushed inward by the abutment 2P which rotates until it comes into contact with the pin P1 or P2. When the free ends of the leaf springs are pushed inward, the leaf springs give a reaction force to the abutment 2P so that the front lens barrel 2 is subject to a resistance against the movement of the lens barrel 2. Thus, the leaf springs E1 and E2 serve as brake members of the movement of the front lens barrel 2 when the latter comes to its extremities.

It should be noted that the pins P1 and P2 are insulated from the zooming barrel 4 by means of insulating bushes 15 and are connected to one end of the brushes 6a and 6d, respectively.

The abutment 2P which is made of a conductive material is brought into contact with the leaf spring E1 or E2 when the abutment comes into contact with the pin P1 or P2. Since the leaf springs E1 and E2 are electrically connected to the zooming barrel 4, the leaf springs form detection switches FSW and NSW for detecting the end positions of the movement of the front lens barrel 2, respectively. The switches FSW and NSW correspond to the infinite object distance detecting switch FSW and the shortest object distance detecting switch NSW shown in FIG. 9, respectively.

Figure 6:
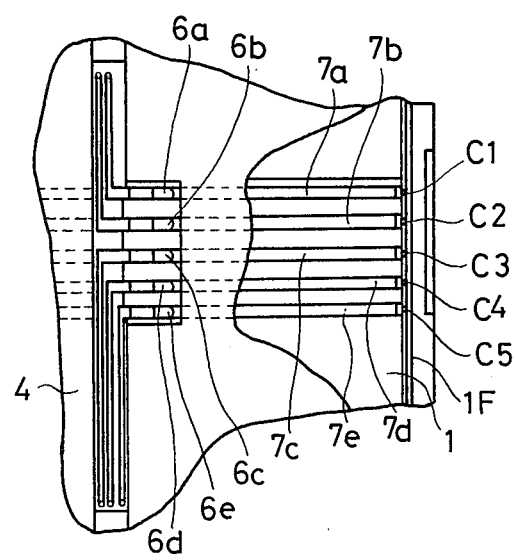
FIG. 6 is a developed view of brushes and lead plates, viewed from the direction designated by an arrow VI in FIG. 4.

For the clarification of the drawings, only one of the pins, i.e, only pin P1 and the components corresponding to the pin P1 are illustrated in FIGS. 7 and 8. The other pin P2 and the components corresponding thereto have a symmetrical relationship to the pin P1 and the components corresponding thereto. The brushes 6a and 6d are secured, together with brushes 6b, 6c and 6e, to and insulated from the zooming barrel 4, and lead plates 7a, 7b, 7c, 7d and 7e which come into contact with the corresponding brushes 6a–6e, respectively are secured to and insulated from the stationary barrel 1. The lead plates 7a–7e have elongated band plate extending in the direction of the focal axis so that the lead plates are always in contact with the corresponding brushes of the zooming barrel 4 which moves in the axial direction, as shown in FIGS. 1 and 2 and 6. The lead plates 7a–7e are connected, at their rear ends, to connector pins C1, C2, C3, C4 and C5 which are provided on and insulated from a mount flange surface 1F of the stationary barrel 1, respectively, as shown in FIGS. 5 and 6.

The connector pins C1–C5 are connected to corresponding connector pins K1–K5 on a mount surface 1K of the camera body K respectively, when the lens barrel is attached to the camera body K by means of the mount 1M (FIG. 5) of the lens barrel and the mount 1L of the camera body K, as shown in FIG. 9. The connector pins C2 and C3 which are connected to the connector pins K2 and K3 of the camera body K are adapted to receive signals from a control device, i.e, a focus detecting device 13 on the camera body K and to transmit the signals to a control circuit 9 of the driving motor M, through the lead plates 7b and 7c, and the brushes 6b and 6c, respectively. On the other hand, a connector pin C5 connects a camera switch circuit 14 of the camera body and a barrel switch circuit 12 of the lens barrel, by means of a connector pin K5, the lead plate 7e and the brush 6e. The focus detecting device 13 is per se known and is disclosed for example in U.S. Pat. No. 4,045,804. The present invention is not directed to the construction of the focus detecting device.

When the lens barrel constructed above is mounted to the camera body, a circuit shown in FIG. 9 is formed and a focus control system consisting of the focussing lens means 10 (which include the front and rear lens means in the embodiment illustrated in FIG. 1)→the focus detecting device 13→the bridge circuit 9→the driving motor M→the drive mechanism G→the focussing lens means 10 is completed. When both the power switch S1 on the lens barrel and the power switch S3 on the camera body are turned ON, so that the electrical power can be fed to the focus detecting device 13 and the driving motor M, the focussing operation by the focus control system can be effected by either the actuation of the camera switch circuit 14 or making on the external actuation switch S2 of the lens barrel, so that the focussing lens means 10 and accordingly the front lens barrel 2 is moved to its focal position.

When the front lens barrel 2 comes to the front or rear end position, the abutment 2P deforms the leaf spring E1 or E2 so that the abutment 2P is subject to a spring reaction of the leaf spring. Consequently, a large resistance against the movement of the front lens barrel produces, so that there is no possibility that the abutment 2P is subject to a large shock or rebounds or oscillates, when it comes into contact with the pin P1 or P2. Since the abutment 2P ensures the reliable electrical connection between the leaf springs E1, E2 and the corresponding pins P1, P2, the infinite object distance detection switch FSW and the shortest object distance detection switch NSW can give detection signals of the extremities of the movement of the front lens barrel 2, to the focus detecting circuit 13 of the camera body K.

The focus detecting device 13 gives a control signal to the bridge circuit (control circuit) 9, in accordance with the detection signals. That is, for example, when the camera switch circuit 6 or the external actuation switch S2 is turned ON to photograph an object which is located at a short distance, and when the focussing lens means of the lens barrel is located at the infinite object distance, a control signal is fed to the control circuit 9 so that the driving motor causes the focussing lens means 10 to be automatically rotated toward a finite object distance. Alternatively, in case where the focussing lens means is located at the shortest object distance position, and when the main switch is turned ON to photograph an object which is located at a shorter distance, a control signal is fed to the control circuit 9 so that the driving motor M is not driven and an indicator in the finder indicates that the object is out of a predetermined range of the object distance in which the object can be photographed. When the object is located within the range, a control signal is fed to the driving motor to move the focussing lens means toward the infinite object distance position. The feed back of the output of the device detecting the displacement of the focussing lens means, to the camera body makes it possible to control the driving motor M in an optimum way.

The focussing operation is effected also for the zooming barrel 4 which is located between positions shown in FIGS. 1 and 2, in the same way as mentioned above. That is, since the sliding contact terminal assembly consiting of the brushes 6a–6e and the lead plates 7a–7e is alway kept at a contact position in which the brushes are connected to the lead plates, independently of the axial position of the zooming barrel 4, it is ensured that the transmitting and receiving operation of the control signals between the focus detecting device 13, the bridge circuit 9 and the detecting device of the displacement of the focussing lens means can be effected.

When the present invention is applied to an optical lens system other than a zoom lens, the optical lens system is considered to be entirely a focussing lens means. Therefore, in this consideration, the front lens barrel 2 and the rear lens barrel 3 are integrally connected to each other so as to provide a lens barrel assembly, and the zooming barrel 4, the driving barrel 8 and the mount securing barrel 1 are integrally interconnected so as to provide a barrel assembly. The lens barrel assembly is engaged in the barrel assembly by means of a helicoid H. In addition, the brushes 6a–6e and the lead plates 7a–7e are integrally interconnected. The actuation buttons S2 may be provided on the stationary barrel 1. By this modification, the present invention is applicable to an optical lens system other than a zooming lens.

In this illustrated embodiments, the leaf springs E1 and E2 which serve as brake members for the movement of the focussing lens means (front lens barrel 12) are also used as one element of the detection switches of the extremities of the movement of the focussing lens means, and, accordingly, the camera mechanism can be simplified and the number of components thereof can be decreased. However, it is also possible to provide the detection switches which are separate from the brake members. Furthermore, such detection switches can be dispensed with, if unnecessary. The leaf springs which are made of a metal and which form the brake members can be replaced by cushion or damper members made from an elastic material, such as a rubber, or a felt.

The invention has been described in detail with particular reference to preferred embodiments thereof, but it will be understood that variations and modifications can be effected without changing the basic scope of the invention as described herein above.

I claim:

1. An interchangeable lens barrel for an automatic focussing camera comprising focussing lens means which are screwed in a non-rotatable member of the lens barrel and which rotate about and move in the direction of the optical axis, a driving mechanism for rotating the focussing lens means in response to a drive signal from a focus detecting device of a camera body to which the lens barrel is to be mounted, said focussing lens means being capable of moving between front and rear extremities which are defined by the engagement of an abutment provided on the focussing lens means with a pair of stops which are provided on the non-rotatable member of the lens barrel and which come into contact with the abutment to limit the movement of the focussing lens means, wherein the improvement comprises brake means provided in the vicinity of the stops and engaged by the abutment to increase the resistance against the movement of the focussing lens means at the extremities.

2. An interchangeable lens barrel according to claim 1, wherein said brake means comprise leaf springs mounted to the non-rotatable member of the lens barrel for radially and inwardly bearing against the abutment in order to increase the resistance against the movement of the focussing lens means.

3. An interchangeable lens barrel according to claim 1, further comprising a mount securing lens barrel having a mount which can be attached to a mount of a camera body.

4. An interchangeable lens barrel according to claim 3, wherein said non-rotatable member is a zooming barrel which can be axially displaced with respect to the mount securing lens barrel.

5. An interchangeable lens barrel according to claim 4, further comprising detection switch means for detecting the two extremities of the movement of the focussing lens means, said switch means being composed of the stops of the non-rotatable member, the brake means, and the abutment of the focussing lens means for connecting the stops and the brake means, the detection signal from the detection switch means being fed to the focus detecting device of the camera body.

6. An interchangeable lens barrel according to claim 5, further comprising signal transmitting and receiving means on the mount of the lens barrel that is opposed to the mount of the camera body, for transmitting and receiving the signals between the focus detecting device of the camera body, the driving mechanism of the lens barrel, and the detection switches.

7. An interchangeable lens barrel according to claim 6, wherein said driving mechanism comprises a driving circuit which are arranged, together with the detection switches, on the zooming barrel which can be axially displaced with respect to the mount securing barrel.

8. An interchangeable lens barrel according to claim 7, further comprising sliding contact terminals which always connect the driving circuit and the detection switches to the signal transmitting and receiving means, independently of the axial displacement of the zooming barrel and which are provided between the zooming barrel and the mount securing barrel.

9. An interchangeable lens barrel according to claim 8, wherein said signal transmitting and receiving means comprises a plurality of connector pins which are located on and insulated from the surface of the mount of the lens barrel that is opposed to and is brought into contact with a surface of the mount of the camera body.

10. An interchangeable lens barrel according to claim 1, wherein said brake means comprise non-conductive damping members mounted to the non-rotatable member of the lens barrel.

* * * * *